US012792093B2

(12) United States Patent
Kumta et al.

(10) Patent No.: US 12,792,093 B2
(45) Date of Patent: Nov. 10, 2026

(54) ALL-IN-ONE INTEGRATED, INTER-CONVERTIBLE FOLDABLE CELL PHONE, TABLET AND PERSONAL COMPUTER

(71) Applicant: UNIVERSITY OF PITTSBURGH—OF THE COMMONWEALTH SYSTEM OF HIGHER EDUCATION, Pittsburgh, PA (US)

(72) Inventors: Prashant N. Kumta, Pittsburgh, PA (US); Moni K. Datta, Pittsburgh, PA (US); Oleg Velikokhatnyi, Pittsburgh, PA (US); Prashanth Jampani Hanumantha, Pittsburgh, PA (US); Bharat Gattu, Pittsburgh, PA (US); Pavithra Murugavel Shanthi, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 219 days.

(21) Appl. No.: 16/647,047

(22) PCT Filed: Sep. 17, 2018

(86) PCT No.: PCT/US2018/051299
§ 371 (c)(1),
(2) Date: Mar. 13, 2020

(87) PCT Pub. No.: WO2019/055897
PCT Pub. Date: Mar. 12, 2019

(65) Prior Publication Data

US 2020/0264663 A1 Aug. 20, 2020

Related U.S. Application Data

(60) Provisional application No. 62/559,004, filed on Sep. 15, 2017.

(51) Int. Cl.
*G06F 1/16* (2006.01)
*H01M 4/134* (2010.01)
(Continued)

(52) U.S. Cl.
CPC .......... *G06F 1/1635* (2013.01); *H01M 4/134* (2013.01); *H01M 4/1395* (2013.01);
(Continued)

(58) Field of Classification Search
CPC ............ G06F 1/1636; H01M 10/0585; H01M 10/0525; H01M 10/0565; H01M 4/364;
(Continued)

(56) References Cited

U.S. PATENT DOCUMENTS 9,189,028 B2 11/2015 Nakhimov
2010/0221614 A1 9/2010 Bertin et al.
2010/0330419 A1 * 12/2010 Cui ........................ H01M 4/04 29/623.5
(Continued)

FOREIGN PATENT DOCUMENTS

WO WO2016145429 A1 * 9/2016

OTHER PUBLICATIONS

Kumta, New Lamination and Doping Concepts for Enhanced Lithium-Sulfur Performance (Jun. 6, 2016), Slide 21-23, (https://www.energy.gov/sites/prod/files/2016/06/f32/es279_kumta_2016_p_web.pdf) (Year: 2016).*
Piotrowska et al., "Properties of PVdF/HFP inorganic Al2O3 filler modified gel electrolytes". 2010, ECS Transactions, 25, 221-230 (Year: 2010).*
(Continued)

*Primary Examiner* — Armindo Carvalho, Jr.
(74) *Attorney, Agent, or Firm* — Carol A. Marmo; Eckert Seamans Cherin & Mellott, LLC

(57) ABSTRACT

The invention relates to size-adjustable all-in-on electronic devices. The devices include a plurality of flexible layers in a stacked configuration, comprising: a flexible LED screen, flexible electronics, a flexible battery unit, and a flexible casing. Further, the devices include a flexible anode, flexible cathode and flexible electrolyte. The flexible components are conformable to the size-adjustable all-in-one electronic devices. The size-adjustable, all-in-one electronic devices are a single device that may be folded/unfolded or rolled/unrolled to function as a cell phone, a tablet, and a laptop personal computer.

8 Claims, 10 Drawing Sheets

(51) Int. Cl.

| | |
|---|---|
| ***H01M 4/1395*** | (2010.01) |
| ***H01M 4/38*** | (2006.01) |
| ***H01M 10/04*** | (2006.01) |
| ***H01M 10/0525*** | (2010.01) |
| ***H01M 10/42*** | (2006.01) |
| ***H04M 1/02*** | (2006.01) |

(52) U.S. Cl.
CPC ........... *H01M 4/382* (2013.01); *H01M 4/386* (2013.01); *H01M 10/0436* (2013.01); *H01M 10/0525* (2013.01); *H01M 10/425* (2013.01); *H04M 1/0214* (2013.01); *H04M 1/0262* (2013.01); *H01M 2220/30* (2013.01)

(58) Field of Classification Search
CPC ........... H01M 4/386; H01M 2004/022; H01M 2220/30; H01M 2300/0085
See application file for complete search history.

(56) References Cited

U.S. PATENT DOCUMENTS

| | | | | |
|---|---|---|---|---|
| 2014/0029017 | A1 | 1/2014 | Lee et al. | |
| 2016/0036037 | A1* | 2/2016 | Rhodes ............. | H01M 10/0525 429/231.95 |
| 2016/0154435 | A1 | 6/2016 | Yanagisawa | |
| 2016/0372718 | A1 | 12/2016 | Keates | |
| 2020/0112050 | A1* | 4/2020 | Hu .................... | H01M 10/0525 |

OTHER PUBLICATIONS

Kumta et al., Engineering Approaches To Dendrite-Free Lithium Anodes, Progress Report Advanced Battery Materials Research (BMR) Program (Aug. 2017). <https://bmr.lbl.gov/wp-content/uploads/sites/31/2019/04/FY18-Quad-Chart_Kumta_Li-Metal.pdf>.

* cited by examiner

ALL-IN-ONE INTEGRATED, INTER-CONVERTIBLE FOLDABLE CELL PHONE, TABLET AND PERSONAL COMPUTER

CROSS-REFERENCE TO RELATED APPLICATIONS

This application is a U.S. National Stage Application under 35 U.S.C. § 371 of International Patent Application No. PCT/US2018/051299, filed on Sep. 17, 2018, entitled “AN ALL-IN-ONE INTEGRATED, INTER-CONVERTIBLE FOLD-ABLE CELL PHONE, TABLET AND PERSONAL COMPUTER”, which claims priority under 35 U.S.C. § 119(e) to U.S. Provisional Patent Application Ser. No. 62/559,004, filed Sep. 15, 2017, entitled “AN ALL-IN-ONE INTEGRATED, INTER-CONVERTIBLE FOLD-ABLE CELL PHONE, TABLET AND PERSONAL COMPUTER”, which are herein incorporated by reference.

GOVERNMENT SUPPORT AND FUNDING

The invention was made with government support under DE-EE0008199 and DE-EE0007797 awarded by the Department of Energy. The government has certain rights in the invention.

FIELD OF THE INVENTION

The invention generally relates to all-in-one integrated, inter-convertible fold-able devices, including cell phones, tablets and personal laptop computers, as well as flexible components including flexible anodes, flexible cathodes and flexible electrolytes for use in lithium ion batteries that are conformable for said all-in-one devices.

BACKGROUND OF THE INVENTION

Various technological advancements, such as, the development of various mobile applications, depend on the amount of energy that can be carried onboard. For example, it is typical for electric cars to run for 100-300 miles and cell phones to be in use for 24 hours or less, before the batteries need to be charged. Improvements in energy storage capacity per unit mass/volume is needed to expand the limits of these technologies. Lithium has shown to be an ideal ion for shuttling in a battery electrolyte system. However, electrolyte breakdown, volumetric change and dendrite formation resulting in cell-shorting during cycling are major problems associated with the use of lithium metal anodes (LMA).

It is known that the use of lithium metal anodes (LMA) for battery applications is largely hindered by the massive volumetric change and inhomogeneous nucleation associated with lithium plating/deplating processes. This process inevitably results in the formation of sharp structures with high local current densities, referred to as lithium dendrites. These sharp structures tend to act as growth sites. Thus, large lithium dendritic structures are often responsible for cell shorting and eventual failure due to separator puncture. Dendrite formation in lithium has been seen as a major stumbling block halting the progress and commercialization of high energy battery systems, such as lithium-sulfur and lithium-air batteries.

In addition, the loss of coulombic efficiency as a result of lithium reacting with electrolyte (on account of high local current densities) results in the formation of solid electrolyte interphase (SEI) (a passivating layer), which is also known to occur.

There is a considerable effort in the development of all solid-state electrolytes as a replacement to traditional liquid electrolyte used in current lithium ion batteries (LIBs). These solid-state electrolytes should meet the high ionic conductivity demands along with low leakage currents, as well as provide a wide electrochemical operating window and chemical compatibility with electrodes. The materials also require an easy manufacturing procedure that is environmentally friendly to facilitate scalability.

Research focused on solid electrolytes has identified various different classes of materials that partially satisfy the above demands. Single crystalline, polycrystalline and amorphous ceramics are found to exhibit good Li-ion conductivity. These solid electrolytes generally contain monovalent protons, divalent ions, lithium and/or fluoride ions. These ceramic compounds conduct ions by the movement of ionic point defects, the creation and movement of which requires energy. As a result, the conductivity of these compounds increases with increased temperature. However, ionic conduction in some compounds is reasonably high even at relatively low temperatures, so several types of lithium-ion conducting inorganic ceramic sulfides, phosphates and oxides have been investigated for use in lithium-ion batteries.

Phosphate based inorganic ceramic electrolytes of LIPON and NASICON—like compounds exhibit a wide electrochemical stability window and are chemically compatible with lithium electrodes. But, the conductivity of these compounds is low (~$10^{-6}$ S $cm^{-1}$) at room temperature. Sulfide-based ceramic ionic conductors fall under the $Li_2S$—$Li_2P_5$ and the LiSICON class of compounds. On the other hand, $Li_{10}GeP_2S_{12}$ (LGPS), and different variants of the super-ionic conductor, have a reported ionic conductivity of ~12 mS $cm^{-1}$ at room temperature that rivals many liquid electrolytes, and appears to be stable over a relatively wide operating voltage range. However, the expensive nature of germanium, the hygroscopic nature and the rapid decomposition of these sulfides upon exposure to atmospheric moisture forming toxic $H_2S$ gas restricts handling of these materials in ambient air. The perovskite $(La,Li)TiO_3$ (LLTO) and garnet oxides based on $Li_5La_3Ta_2O_{12}$ are promising solid ionic conductors. However, these oxides have a tedious, cumbersome and comprehensive synthesis procedure that poses serious scalability issues.

The most primitive and age-old solid lithium ion conductor is lithium orthosilicate ($Li_4SiO_4$) and its derivatives. The unit cell of $Li_4SiO_4$ contains two $SiO_4^{-4}$ tetrahedra linked by eight lithium ions, which are distributed over 18 possible sites. The conductivity of pure $Li_4SiO_4$ is rather low (~$10^{-12}$ S $cm^{-1}$) at room temperature. Doping is a strategy that has been widely used for improving the ionic conductivity of crystals. It has been demonstrated that the activation energy for lithium ion hopping is lowered by the introduction of vacancies during doping, which results in an increase in the ionic conductivity. However, the room temperature ionic conductivity of $Li_4SiO_4$ is very limited necessitating the identification of novel dopants to make high ionic conductivity lithium ion conducting (LIC) materials for use as coatings on sulfur cathodes.

There is a need in the art to design and develop all-in-one integrated, inter-convertible fold-able devices including cell phones, tablets and personal computers, as well as flexible components for use in lithium ion batteries that are conformable for the all-in-one integrated devices. Further, the highly efficient alloys and methods of the invention should be effective for reversibly storing and cycling lithium absent of dendritic growth that can provide high power lithium-anode based batteries.

SUMMARY

In one aspect, the invention provides a size-adjustable all-in-one electronic device that includes a plurality of layers in a stacked configuration, which includes a flexible LED screen; flexible electronics; a flexible battery unit that includes a flexible anode, a flexible cathode, and a flexible electrolyte; and a flexible casing. The plurality of layers is conformable to the size-adjustable all-in-one electronic device, and the size-adjustable, all-in one electronic device is a single device that functions as a cell phone, a tablet, and a laptop personal computer.

The device can be adjusted to function as a laptop personal computer, an electronic tablet and a cell phone. In certain embodiments, the size is adjusted by folding. Alternately, the size can be adjusted by rolling.

In certain embodiments, the flexible anode is a lithium metal alloy foam including a structurally isomorphous alloy. In certain embodiments, the flexible anode and flexible cathode each comprise a mat composed of electro-spun fibers. The flexible anode can include silicon fibers, and the flexible cathode can include sulfur fibers. The flexible electrolyte can include a flexible gel-polymer and a nanostructured filler. The flexible anode, flexible cathode and flexible electrolyte may be stitched together to form a textile-like mat.

In another aspect, the invention provides a method of preparing an size-adjustable all-in-one electronic device. The method includes forming a plurality of sequential layers, which includes obtaining a flexible LED screen; connecting flexible electronics to the flexible LED screen; connecting a flexible battery unit to the flexible electronics, the flexible battery unit that includes a flexible anode, a flexible cathode, and a flexible electrolyte; and connecting a flexible casing to the flexible battery unit. The plurality of layers is conformable to the size-adjustable all-in-one electronic device, and the size-adjustable, all-in one electronic device is a single device that functions as a cell phone, a tablet, and a laptop personal computer.

In certain embodiments, the flexible anode and the flexible cathode are each prepared by electrospinning a silicon fibers and a sulfur fibers, respectively, in a mat form.

BRIEF DESCRIPTION OF THE DRAWINGS

A full understanding of the disclosed concept can be gained from the following description of the preferred embodiments when read in conjunction with the accompanying drawings.

DETAILED DESCRIPTION OF THE INVENTION

Figure 1:
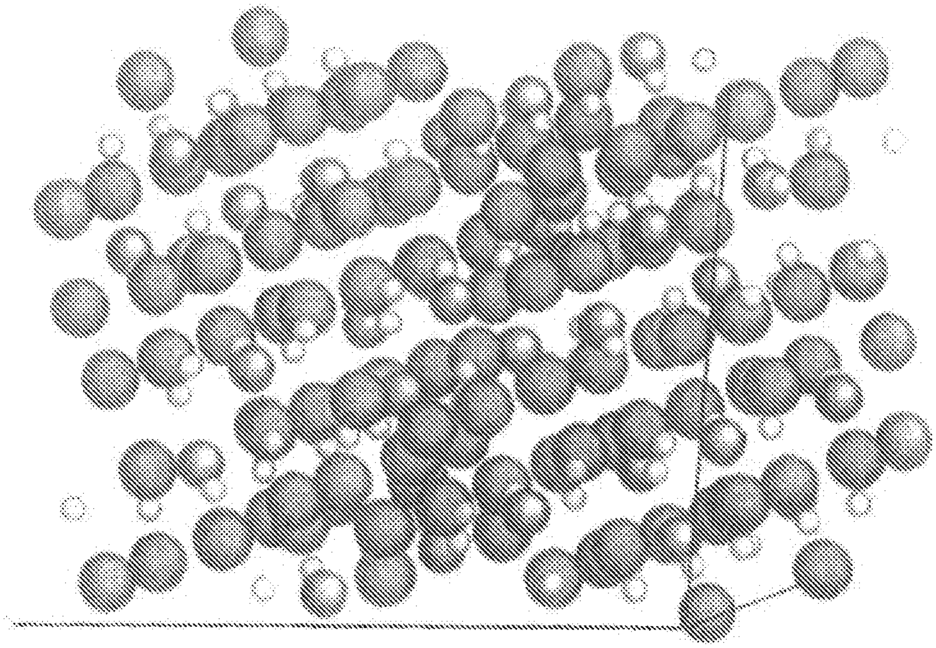
FIG. 1 is a schematic showing the unit cell of $Li_4SiO_4$ crystal structure, wherein the large balls represent Si, the medium balls represent O, and the small balls represent Li.

The invention relates to flexible, size adjustable, all-in-one integrated devices or systems. The all-in-one devices or systems are inter-convertible fold-able devices, such as, cell phones, tablets and personal laptop computers, as well as flexible components, e.g., anodes, cathodes and electrolytes, for lithium ion battery applications that are conformable for the all-in-one devices. The invention includes integrating one or more flexible thin film energy storage systems into flexible electronics and flexible display units to form high energy density and high performance electronic mobile and convertible cell phone, tablet, and laptop personal computer devices. The integration of the flexible components allows for the design and development of the all-in-one cell phone/tablet/laptop personal computer that can be customized to user preferences, e.g., the size and shape of the device. The all-in-one flexible systems will result in portable, handheld systems that are easily adjusted, e.g., folded or closed, into a compartmentalized match box-sized system, and then easily re-adjusted, e.g., unfolded or opened, to a desired handheld size to function as a cell phone, or further unfolded or opened to function as a tablet device, or completely unfolded or opened to function as a laptop personal computer. Thus, a single, flexible system or device provides the user with a cell phone, a tablet, and a laptop computer. In certain embodiments, the all-in-one flexible system unfolded is the size of a typical cell phone, or a tablet device, or a laptop computer, and then when folded is significantly smaller than the size of a typical cell phone. Alternately, instead of folding/unfolding, the all-in-one flexible system may be rolled and unrolled, e.g., into a cylindrical shape, for example, a tube. The ability to fold/unfold and roll/unroll electronic devices allows a tablet or laptop computer to be carried in a pocket that typically is only large enough to carry a handkerchief.

In certain embodiments, the all-in-one devices or systems include a plurality of sequential layers or sheets including a LED screen, electronics, battery unit and casing. The layers/sheets are in a stacked configuration. For example, the first layer/sheet is the LED screen having front and back surfaces; one surface of the electronics layer/sheet is connected or attached to the back surface of the LED screen; the opposite surface of the electronics layer/sheet is connected or attached to a surface of the battery unit layer/sheet; the opposite surface of the battery unit layer/sheet is connected to a surface of the casing; the opposite surface of the casing forms the exterior surface of the all-in-one device or system.

The flexible all-in-one systems use flexible battery units including flexible cathode systems, flexible anode systems, and flexible gel-polymer electrolyte systems. In certain embodiments, an electrospinning method is used to generate each of these three systems as standalone sheets that are assembled (e.g., composite) to create a flexible battery device. An electrospinning method capable of generating the aforementioned systems as standalone spinnable devices consists of the following (stacked) layers: anode current collector, anode active material, electrolyte, cathode active material, cathode current collector, and polymer battery shell. Electrospun fibers that are generated have a yarn-like quality, such that they can be woven into a fabric for a variety of applications. A textile-like weaving method can be employed to stitch together the various electrode yarns and the battery device yarn into textile-type morphologies and various other flexible configurations. The electrode and battery device configurations of the invention possess high electronic conductivity, minimal volumetric expansion, improved rate capabilities and superior cycling ability.

The flexible anode system for use in the invention may include a composite of electro-spun fibers, such as, electro-spun silicon fibers. The fibers can have a surface that exhibits a smooth or irregular surface topography depending on the nature of the bias and the viscosity of the spinning solution. The fibers are used in preparing silicon anodes. The unique fiber morphology, derived by the electro-spinning methods having the capability of generating the flexible silicon fibers, provides an opportunity for small-scale mobile device applications, such as, textile batteries.

Electrospun fibers have a pliable morphology and, can be handled and synthesized with ease. The fibers are capable of being woven directly into anodes for textile batteries. The silicon polymer fibers are composed of a silicon component and a polymer component, e.g., precursors. In certain embodiments, silicon nanoparticles and polymer are dissolved, e.g., co-dissolved, in solvent to form a unique electro-spinnable solution, and then the solution is electro-spun into the fibers. The silicon component can be selected from a wide variety of active sulfur compounds known in the art, such as, but not limited to, silicon powder, silicon nanoparticles, and mixtures thereof. The polymer component can be selected from a wide variety of known polymers. Optionally, graphene can be included in the polymer component. Thus, in certain embodiments, the polymer is a mixture of polymer and graphene. The solvent can be selected from known solvents.

The electro-spun silicon fibers can be interconnected to form a web or mat. As mentioned, the diameters of the fibers can vary and in certain embodiments, can be from about 10 nanometers to about 100 microns. In certain embodiments, the electro-spun silicon fibers, are from about 1 to about 7 μm. The individual fibers in the mat, e.g., nonwoven mat, can have a random orientation or can be predominantly oriented in one or more directions.

In accordance with the electro-spinning methods, the resulting electro-spun silicon fibers, have a unique morphology amenable for flexible battery applications. The electro-spun silicon fibers can include silicon, e.g., nanoparticles, embedded in and decorated on the polymer fiber. The fibers can include a composite configuration having a textile-mat-like morphology, e.g., consisting of layers of silicon fibers and polymer. The textile-like mat can be heat treated, for example, at a temperature from 400° C. to 700° C., to produce a flexible composite electrode wherein the silicon (e.g., nanoparticles) are embedded in and decorated on the carbon fibers. As a result of heat treatment, the electro-spun composite mats are converted to flexible carbonized mats.

In certain embodiments, the flexible silicon anode mat consists of thin silicon fibers, e.g., from about 200 to about 400 nm including, for example, from about 45 to about 80 percent by weight of silicon, wherein the thickness may be from about 300 to about 500 microns.

In certain other embodiments, the flexible anode system for use in the invention includes lithium metal anodes (LMAs). The LMAs are formed by porous metal alloy foam and a lithium ion conductor coating. It has been found that the LMAs in accordance with the invention are effective to mitigate or preclude dendrite formation and volumetric changes typically associated with plating/deplating of large volumes of lithium.

The porous metal alloy foam may include metal selected from a variety of suitable metals known in the art including, but not limited to, lithium, magnesium, iron, copper and the like. Thus, the porous metal alloy foam may be lithium-, magnesium-, iron-, or copper-rich or based. The porous metal alloy foam includes structurally isomorphous alloys (SIAs) of the metal. In certain embodiments, the porous metal alloy foam includes SIAs of lithium and, optionally, magnesium. In certain embodiments, the LMAs include a solid solution of magnesium that optionally has other elements present, such as but not limited to, zinc, aluminum, yttrium, calcium, strontium, silver, iron, and mixtures and combinations thereof.

The lithium ion conductor (LIC) coating can include ternary lithium silicate, such as but not limited to, lithium orthosilicate ($Li_4SiO_4$), and lithium phosphate ($Li_3PO_4$) and lithium phosphosulfide ($Li_3PS_4$).

The development of novel lithium anodes having improved properties and characteristics provides for the potential use of lithium metal-free cathodes for lithium ion battery applications. However, safety concerns have been associated with the lithium anode battery systems due to lithium dendrite formation during plating/deplating and the potential for separator puncture and cell shorting, leading to thermal runaway and explosive cell failure. With respect to mitigating or precluding dendrite formation, the current density has been identified as a primary factor in dendrite nucleation and growth.

According to certain embodiments of the invention, the LMAs include Li-rich structurally isomorphous alloys (SIAs), and SIAs with magnesium. The SIA materials have a cubic lithium structure that they can maintain over a wide composition spectrum. For example, a SIA of lithium can retain its cubic structure upon removal of approximately 40% of the lithium.

The LMAs according to the invention are capable of undergoing lithiation/delithiation without loss in phase and crystal structure. Further, crystallographic structure is shown to have stable dendrite-free cycling for over 200 cycles with outstanding capacities in excess of 15 mAh/cm$^2$ (approximately 1630 mAh/g). In addition, a complete absence of dendrites is observed at current densities as high as about 16 mA/cm$^2$.

The LMAs include porous foam, which may be multilayer porous foam. In certain embodiments, the porous foam consists of a cage-like conductive structure. This structure can allow for lithium cycling without significant anode expansion-contraction. Further, the presence of the SIAs and use of alloying provide means to circumvent the dendritic structures that are nucleation- and growth-dependent. The SIAs prevent dendritic growth by adopting a non-nucleation-based mechanism. Furthermore, in accordance with the invention, a thin lithium-ion conductor coating (LIC) deposited on the porous foam contributes to preventing orthogonal growth of dendrites. Combining these approaches leads to the formation of composite multilayer anodes consisting of high surface area porous foams of SIA materials (e.g., Li alloy) coated with a thin LIC coating, resulting in specific capacities on the order of about 1600 mAh/g. As aforementioned, the porous foam can also include solid solutions of magnesium with other elements, such as, zinc, aluminum, yttrium, calcium strontium, silver, iron, and mixtures and combinations thereof. These materials and methods are effective to provide LMAs for reversibly storing and cycling lithium with no dendritic growth.

In certain embodiments, the solid lithium ion conductor (LIC) includes a ternary lithium silicate, such as lithium orthosilicate ($Li_4SiO_4$), lithium phosphate ($Li_3PO_4$) and lithium phosphosulfide ($Li_3PS_4$). Doped $Li_4SiO_4$, $Li_3PO_4$ and $Li_3PS_4$ can provide LIC materials having high ionic conductivity for use as coatings on sulfur cathodes. Various conventional/traditional doping techniques are known in the art for improving the ionic conductivity of crystals. Using suitable doping techniques, such as a facile solid diffusion technique, a dopant is employed to interact with a corresponding site of the $Li_4SiO_4$, $Li_3PO_4$ and $Li_3PS_4$. The dopant can interact with the lithium ions and/or the silicon atoms and/or the oxygen atoms of the $Li_4SiO_4$. The dopant can also interact with the lithium ions and/or the phosphorous ions, and/or the oxygen atoms of the $Li_3PO_4$. Further, the dopant can interact with the lithium ions and/or the phosphorous ions, and/or the sulfur atoms of the $Li_3PS_4$. Suitable dopants include magnesium, calcium, vanadium, niobium, fluorine, and mixtures and combinations thereof. For interaction with the lithium ions, the dopant can be calcium, magnesium, or mixtures or combinations thereof. For interaction with the silicon and/or phosphorous atoms, the dopant can be vanadium and/or niobium. For interaction with the oxygen and/or sulfur atoms, the dopant can be fluorine.

The lithium ion conductor (LIC) coating is applied or deposited on a surface of the porous metal alloy foam. However, it is contemplated and understood according to the invention that there may be in-pore lithium ion deposition, i.e., lithium ions may be deposited within the pores that are formed in the porous metal alloy foam when the lithium ion conductor coating is applied or deposited thereon.

Without intending to be bound by any particular theory, it is believed that the presence of the lithium ion conductor coating is effective to mitigate or preclude nucleation and orthogonal growth of dendrites during the charge/discharge cycling of a lithium ion battery to improve the electrochemical performance. Further, it is believed that the in-pore lithium deposition may ensure non-uniform nucleation and growth of lithium leading to coalescence within the pore, preventing dendritic growth perpendicular to the separator and resulting in puncture and eventual failure due to shorting of the cells.

In certain embodiments, the composite multilayer lithium ion battery anode is prepared by forming a porous metal alloy foam and depositing a lithium ion conductor coating on the porous metal alloy foam. As described herein, the foam can include a SIA of a metal, such as but not limited to lithium alloy and optionally magnesium, with a solid solutions of magnesium having one or more other elements, e.g., one or more of zinc, aluminum, yttrium, calcium, strontium, iron and silver. The lithium ion conductor coating can include a ternary lithium silicate, e.g., lithium orthosilicate ($Li_4SiO_4$) and optionally a dopant. The lithium ion conductor coating can include a lithium phosphate ($Li_3PO_4$) and optionally a dopant. The lithium ion conductor coating can include a lithium phosphosulfide ($Li_3PS_4$) and optionally a dopant. The porous metal alloy foam can be deposited on a metal current collector. A wide variety of metals are known in the art for use as current collectors, including but not limited to, copper and stainless steel. The lithium ion conductor coating may be deposited as a thin film. The thickness varies, and may be about one micron thick.

In certain embodiments, the SIA alloy can be synthesized by employing high-energy milling followed by a corresponding heat treatment.

In certain embodiments, the flexible cathode system for use in the invention may include a composite of electro-spun fibers, such as, electro-spun sulfur wires or yarns, which can have diameters of a few nanometers to several micrometers and, lengths as short as a few inches to as long as several feet. In certain embodiments, the diameter can be from greater than about 100 nanometers to about 10 μm and, the length can be from about 12 inches to about 24 inches. The fibers can have a surface that exhibits a smooth or irregular surface topography depending on the nature of the bias and the viscosity of the spinning solution. The fibers, e.g., wires or yarns, can be used in preparing sulfur cathodes. The unique fiber morphology, derived by the electro-spinning methods having the capability of generating the flexible sulfur wires or yarns, provides an opportunity for small-scale mobile device applications, such as, textile batteries. Coating the electrodes with an inorganic Li ion conductor results in further improvement of cycling behavior, including stable capacity and low fade rate.

Electrospun fibers have a pliable morphology and, can be handled and synthesized with ease. The fibers are capable of being spun into wires or yarns and woven directly into cathodes for textile batteries. The sulfur-polymer fibers, e.g., wires, are composed of a sulfur component and a polymer component, e.g., precursors. In certain embodiments, sulfur and polymer components are co-dissolved in solvent to form a unique electro-spinnable solution, and then the solution is electro-spun into the wires or yarns. The sulfur component can be selected from a wide variety of active sulfur compounds known in the art, such as, but not limited to, sulfur powder, nano-sulfur powder, and mixtures thereof. The polymer component can be selected from a wide variety of known polymers. Non-limiting examples of suitable polymers include known conducting polymers, such as, but not limited to, polystyrene such as polyaniline, polythiophene, polypyrrole, polyacrylamide, polyvinylidene fluoride, and others selected from a family of nitriles, amines, amides, and ethers, with functional groups selected from oxygen, fluorine, sulfur, selenium, tellurium, phosphorus and nitrogen, and mixtures thereof. Optionally, graphene can be included in the polymer component. Thus, in certain embodiments, the polymer is a mixture of polymer and graphene. In other embodiments, the polymer is a combination or mixture of polystyrene and graphene, as well as a mixture of other polymers as disclosed above with graphene including carbon nanotubes. In these embodiments, the polymer serves as an electron conducting filler, as well as a current collector, e.g., an embedded current collector. The solvent can be selected from known solvents, such as, but not limited to, carbon disulfide.

The sulfur fibers may be formed, e.g., pressed, into a flexible pellet electrode. The flexible pellet electrode may be used as a stand-alone cathode for textile batteries with or without the application of a lithium ion conducting coating.

The electro-spun sulfur fibers can be interconnected to form a web or mat. As mentioned, the diameters of the fibers can vary and in certain embodiments, can be from about 10 nanometers to about 100 microns. In certain embodiments, the electro-spun sulfur fibers, e.g., wires, are from 1-7 μm. The individual fibers in the matte, e.g., nonwoven matte, can have a random orientation or can be predominantly oriented in one or more directions.

In accordance with the electro-spinning methods, the resulting electro-spun sulfur fibers, e.g., wires, have a unique morphology amenable for flexible battery applications. The wires can include a composite configuration having a textile-matte-like morphology consisting of layers of sulfur wires and conducting polymer. The textile-like matte can include a layer of sulfur wires deposited on a current collector and additional layers or sulfur wires separated by conducting polymer deposited thereon, e.g., alternating layers of sulfur wires and conducting polymer are deposited, layer-by-layer, onto the current collector. In certain embodiments, an aluminum current collector is used.

In certain embodiments, the flexible cathode mat consists of sulfur fibers, which may have a fiber diameter from about 1 to about 7 μm, and may consist of about 20 to about 50 percent by weight sulfur with a thickness, for example, from about 1 to about 6 microns.

In certain embodiments, the flexible electrolyte material for use in the invention is a lithium ion conducting composite polymer electrolyte separator (CPE). The CPE includes electrospun poly (vinylidene fluoride-co-hexafluoro propylene) (PVdF-HFP), and the incorporation of PVdF-HFP into a host matrix. In addition to PVdF-HFP, the electrospun host matrix can also include bis(trifluoromethane)sulfonimide lithium salt (LiTFSI), e.g., about 10 wt. %, and particles of nanoparticle silica (nm-$SiO_2$), nanoparticle titania (nm-$TiO_2$) and fumed silica (f-$SiO_2$), e.g., about 10 wt. %.

The CPE provides improved properties and characteristics as compared to separators known in the art, such as but not limited to, liquid lithium electrolyte-based separators. For example, the CPE provided very high lithium ion conductivity, superior flame resistance, mechanically robust membranes with superior yield strength, and very low fade rate during electrochemical cycling due to the preclusion of polysulfide dissolution in a lithium-sulfur battery.

Without intending to be bound by any particular theory, it is believed that the interconnected morphological features of PVdF-HFP occurring as a result of the electrospinning process result in higher lithium ion conductivity, effective lithium ion transport and good interfacial characteristics with a lithium electrode. Higher ionic conductivity and liquid electrolyte up-take (e.g., greater than 250%) with enhanced dimensional stability, lower interfacial resistance and higher electrochemical stability are demonstrated with the CPE in accordance with the invention.

For ease of description, the CPE is described herein with respect to these particular materials. However, it is contemplated and understood that the invention is not limited only to the use of these particular materials. For example, the polymer system or composite is not limited to PVdF-HFP and can include any similar polymer system or composite containing polymer having one or more polar halogen groups. The polymer electrolyte separator of the invention can include any lithium-containing solid or liquid electrolyte, such as but not limited to LiTFSI. Similar electrolytes containing magnesium/sodium suitable for magnesium and sodium ion conduction can be incorporated in the CPE for reversible magnesium and sodium battery applications. Thus, in certain embodiments, the polymer electrolyte separator includes an element selected from magnesium, sodium, and mixtures and combinations thereof. Further, the invention includes nanoparticle filler that may be selected from nano-meter sized particles of various transition metals, as well as metal oxides and metal non-oxides. In certain embodiments, the nanoparticle filler can constitute from 10 to 20 percent by weight. The transition metals, metal oxides and metal non-oxides may be selected from Group III, Group IV, and Group V of the Periodic Table. The metal oxides include, but are not limited to $SiO_2$, $Al_2O_3$, $B_2O_3$, $TiO_2$, $V_2O_5$, fumed $SiO_2$, and mixtures and combinations thereof. The nanoparticle filler may be doped with a dopant. The doped compositions can include $Al_2O_3$, $B_2O_3$, $GeO_2$, $SnO_2$, $Bi_2O_3$, $Sb_2O_3$, and combinations and mixtures thereof. Additionally, nano-sized metal non-oxide particles including nitrides, carbides, borides, sulfides, selenides, tellurides, phosphides, antimonides, arsenides, bismuthides and mixtures thereof may also be incorporated.

According to the certain embodiments of the invention, there are prepared composites of PVdF-HFP incorporating 10 wt. % LiTFSI and 10 wt. % particles of nanoparticle silica (nm-$SiO_2$), nanoparticle titania (nm-$TiO_2$) and fumed silica (f-$SiO_2$) by electrospinning. These electrospun composites, e.g., membranes, may be activated with lithium sulfur battery electrolyte of 50/50 vol. % dioxolane/dimethoxyethane with 1 M LiTFSI and 0.1 M $LiNO_3$.

The electrospun membranes consist of layers of fibers. In certain embodiments, the membranes include multiple layers of electrospun nanofibers in the form of a nanofiber mat. The diameter of the fibers can vary and in certain embodiments, the average fiber diameter is 1-5 μm or 2-5 μm or 1-2 μm. A CPE with f-$SiO_2$ exhibit higher ionic conductivity (e.g., with a maximum of $1.3\times10^{-3}$ S $cm^{-1}$ at 25° C. obtained with 10 wt. % filler composition). An optimum CPE based on PVdF-HFP with 10 wt. % f-$SiO_2$ exhibits enhanced charge-discharge performance in Li—S cells at room temperature (e.g., delivering initial specific capacity of 895 mAh $g^{-1}$ at 0.1 C-rate). The CPE exhibits very stable cycling behavior at well over 100 cycles (fade rate ~0.056%/cycle), demonstrating their suitability for Li—S battery applications. In addition, the interconnected morphological features of PVdF-HFP results in superior mechanical properties (e.g., 200-350% higher tensile strength) and interfacial characteristics reflected as a stabilization of lithium metal anodes in symmetric lithium-metal cells (e.g., stable coulombic efficiency of 99.88% observed over 80 cycles during plating deplating of 12 mAh/$cm^2$ lithium at 3 mA/$cm^2$). Higher ionic conductivity, higher liquid electrolyte uptake (>250%) with dimensional stability, lower interfacial resistance and higher electrochemical stability are demonstrated by the CPE. With these improved performance characteristics, PVdF-HFP is a suitable polymer electrolyte for high-performance Li—S rechargeable batteries.

The CPE may be prepared using conventional electrospinning apparatus and techniques. In certain embodiments, the PVdF-HFP and LiTFSI is dissolved in a solvent to form a homogeneous solution. This solution is dispersed with the nano-filler, e.g., nanoparticles, under sonication. The nano-filler, e.g., nano-particle filler, is prepared in accordance with conventional and other solution and solid state or vapor phase techniques that are known in the art (and described in more detail in the Examples section herein). The composite, e.g., membrane, is prepared by electrospinning of the solution by a conventional electrospinning method at room temperature. The resulting electrospun nanofibers are deposited on a collector, e.g., drum, and dried under vacuum. The nano-particle filler is embedded inside the nanofibers and dispersed on the fiber surface. For example, without intending to be bound by any particular theory, it is believed that the high surface area f-$SiO_2$ filler is advantageous in preventing polysulfide dissolution by forming an insulating film over the cathode. The nanofiber mat formed is heat pressed and activated by soaking in an activation solution, such as a liquid electrolyte (e.g., LiTFSI and $LiNO_3$ in dioxolane/dimethoxyethane). Following uptake of electrolyte, the activated nanofiber mats can be used as a separator-electrolyte complex in a battery.

In certain embodiments, the electrolyte consists of a textile mat-like morphology of layers of ionically conducting gel-polymers, wherein the fiber diameter may be from about 1 to about 7 μm, and the mat thickness may be from about 100 to about 500 microns The electrolyte is positioned between the cathode and anode. Thus, the cathode, electrolyte and anode are in a stacked configuration or composite.

It should be understood that the embodiments described herein and the examples above are for illustrative purposes only and that various modifications or changes in light thereof will be suggested to persons skilled in the art and are to be included within the spirit and purview of this application.

EXAMPLES

Example 1

The crystal structure of $Li_4SiO_4$ and doping strategies that may improve the room-temperature ionic conductivity were evaluated. Using Density Function Theory (DFT), the effect of several monovalent and divalent cations and anions on the $Li^{r}$ conductivity of the crystal and suitable dopant elements were identified. Cation and anion doping of $Li_4SiO_4$ was performed to obtain final crystals of the chemical formula shown by i and ii, as follows:

$(Li_y[\ ]_x X_x)_4 SiO_4$, where X—Ca,Mg,[ ]—vacancy,$x$—0.025 to 0.15; and  i.

$Li_4Si(O_y[\ ]_x F)_4$, where F—Fluorine,[ ]—vacancy,$x$—0.025 to 0.15.  ii.

Lithium orthosilicate was doped with six different concentrations of each of the dopants using a facile solid diffusion technique. Electrochemical Impedance Spectroscopy (EIS) analysis results showed that doping improved the ionic conductivity of $Li_4SiO_4$ by three to four orders. $Ca^{2+}$ doping showed the maximum improvement in ionic conductivity from $1.179\times10^{12}$ S $cm^{1'}$ to $2.870\times10^{-8}$ S $cm^{-1}$.

I. Computational Methodology

A. Crystal Structure $Li_4SiO_4$ is a complex ternary lithium silicate with monoclinic symmetry and space group P21/m. It contains 14 formula units (56 Li, 14 Si, and 56 O atoms) with the following lattice parameters: a=11.546 Å, b=6.090 Å, c=16.645 Å, and β=99.5°, as shown in FIG. 1. The 126 atom crystal structure has isolated $SiO_4$ tetrahedra and Li atoms positioned there around.

For calculating the total energies, electronic structure, and density of electronic states of the materials, the DFT implemented in the Vienna Ab-initio Simulation Package (VASP) was used within the projector-augmented wave (PAW) method and the spin-polarized generalized gradient approximation (GGA) for the exchange-correlation energy. The standard PAW potentials were utilized for the elemental components and the Li, Si, O, Mg, Ca, V, Nb, and F potentials thus contained one, four, six, two, two, five, eleven and seven valence electrons, respectively. In the present theoretical analysis, to maintain high precision for the total energy calculations for all the electro-catalyst compositions, the plane wave cutoff energy of 520 eV was selected. By employing the double relaxation procedure, the internal positions as well as the lattice parameters of atoms were completely optimized.

The minima of the total energies with respect to the lattice parameters and internal ionic positions were also determined. By minimizing the Hellman-Feynman forces via a conjugate gradient method, geometry optimization was achieved. This caused the net forces applied on every ion in the lattice to be near zero. The total electronic energies were converged within $10^{-5}$ eV/un cell, which resulted in the residual force components on each atom being lower than 0.01 eV/A/atom. This allowed an accurate determination of the internal structural parameters. The Monkhorst-Pack scheme was used to sample the Brillouin Zone (BZ) and create the k-point grid for the solids and the different isolated atoms used. The selection of an appropriate number of k-points in the irreducible part of the BZ was made on the grounds of the convergence of the total energy to 0.1 me V/atom. The climbing-image nudged elastic band (CNEB) method also implemented in VASP was used to determine the diffusion pathways and migration barriers of $Li^{+}$-ions in the $Li_4SiO_4$ crystal structure.

B. Electronic Structure

Figure 2:
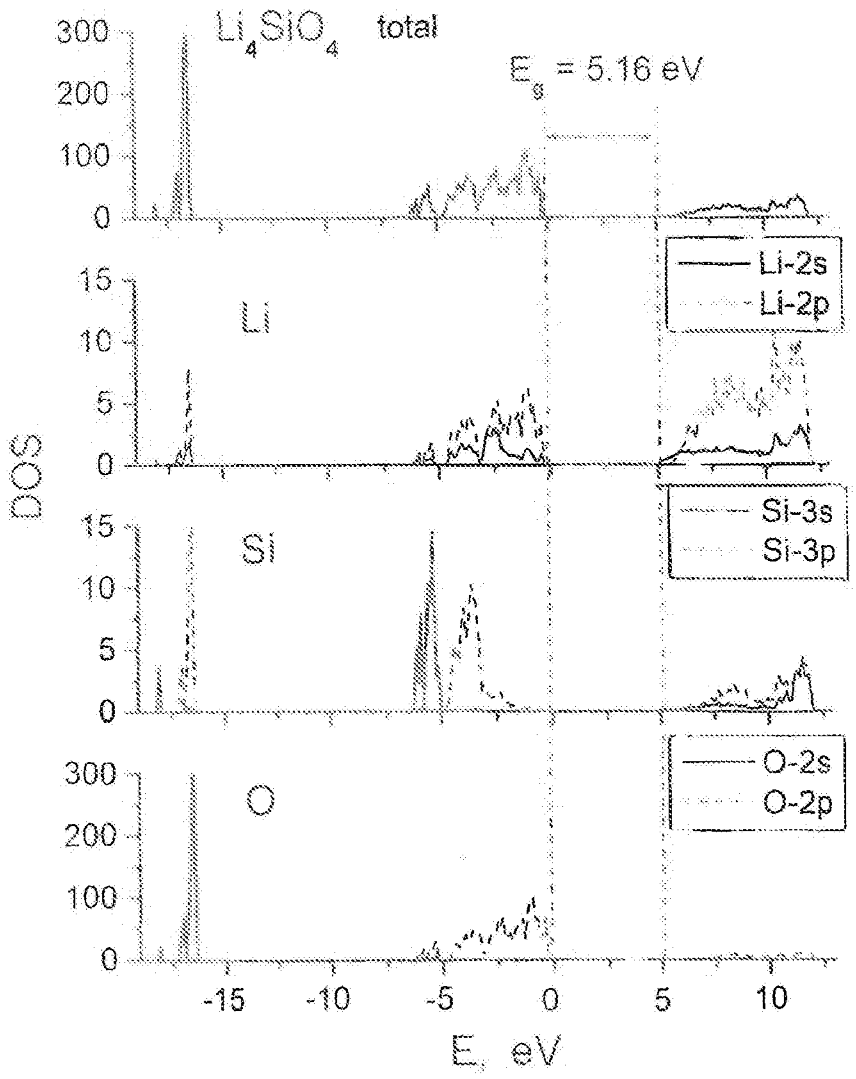
FIG. 2 is an image showing electronic density of states of $LiSiO_4$ wherein zero energy corresponds to Fermi level.

The electronic structure of $Li_4SiO_4$ was considered. FIG. 2 demonstrates the calculated total and projected density of valence electronic states with the Fermi energy set to zero. It was observed that $Li_4SiO_4$ bulk ground properties were mainly determined by the 2p orbital electrons of oxygen atoms. 3s and 3p bands of silicon atoms were slightly overlapped with each other and strongly hybridized with 2p states of oxygen causing covalency in this material. Strong peaks occurred at −1.1, −2.5, −3.7 and −5.2 eV in the upper valence band while the lower valence band contained peaks at −16.8, −17.1, and −18.0 eV. The −1.1 and −2.5 eV peaks mainly resulted from the contributions of O 2p, Li 2s and Li 2p orbitals, −3.7 eV peak came from the O 2p, Si 3p and Li 2s orbital, while −5.2 eV was composed of O 2p, Si 3s and Li 2p orbital. A strong peak at −16.8 eV resulted from the contribution of O 2s, Si 3p and Li 2p, while peaks at −17.1 and −18.0 eV came from O 2s and Si 3s states.

The conduction band mainly consisted of Li 2s, 2p orbitals hybridized with Si 3s, 3p states and separated from the upper valence band with band gap of 5.16 eV. This value could not be considered accurate due to the well-known inability of the density functional methods to accurately predict band gaps in semiconductors and insulators with systematic underestimation on an average of 30-50%. However, this shortcoming was not critical in this experiment since the goal was to predict the general trends in ionic conductivity, and therefore, the calculated value was considered satisfactory.

C. Ionic Mobility of Pure $Li_4SiO_4$

To estimate Li-ion conductivity, various pathways of the Li-ions during propagation through the bulk of the materials were considered. It was assumed that Li-diffusion occurs by means of hopping mechanism from the occupied Li-site to the neighbor Li-vacancy. The activation energy barriers for the various hops between fixed Li-ion vacancy and different closest Li-ions in the crystal lattice were calculated. The Li-diffusion coefficient was expressed as follows:

$$D(T)=a^2\nu^*\exp[-E_a/k_bT] \quad (1)$$

wherein D is the diffusion coefficient, a is the hopping distance (~3.0 Å in this case), ν* is the hopping frequency ($\sim10^{13}$ $s^{-1}$).

Figure 3:
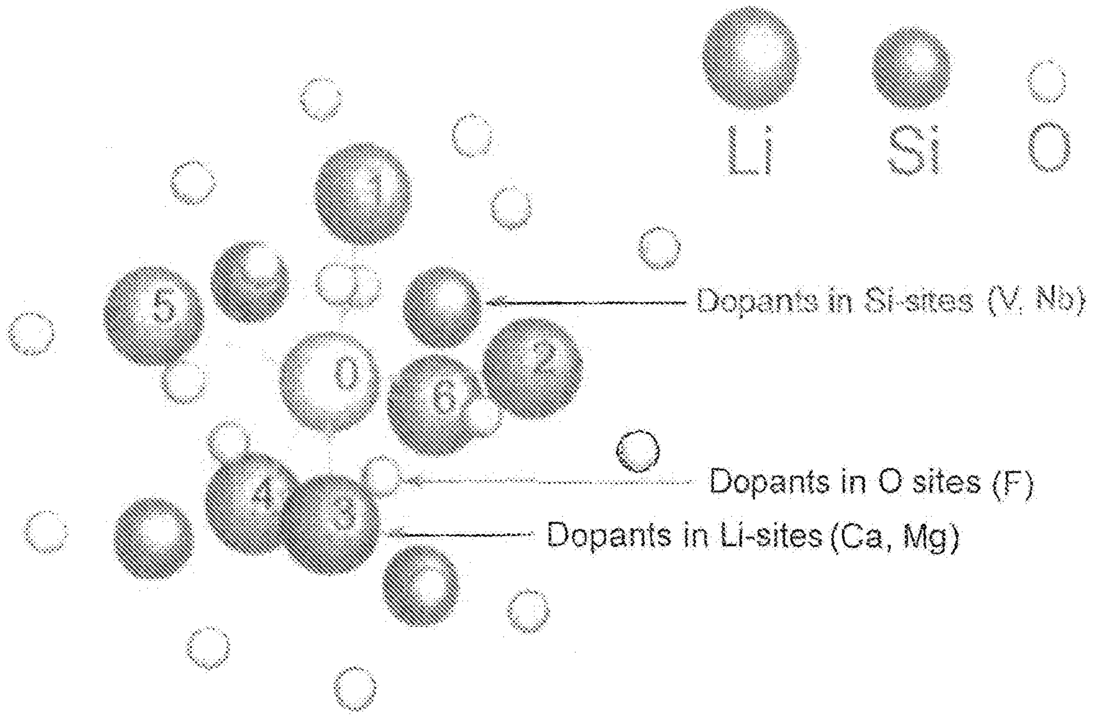
FIG. 3 is a schematic showing Li-vacancy and vicinity.

FIG. 3 shows Li-vacancy in the center marked with zero and the six closest Li-ions from which the six different hops were considered to the central fixed vacancy. Also shown are silicon and oxygen atoms in the vicinity of the Li-vacancy.

Each pathway was divided into eight equal parts reflecting intermediate positions of the Li-ion hopping between occupied and vacant lattice sites. The total energies of the distorted crystal structures were calculated for all the nine consecutive intermediate images where each image was relaxed until the maximum residual force was less than 0.1 meV/A. The energy difference between the initial configuration and the maximum energy obtained for an intermediate position of the specific pathway was considered as an activation barrier $E_a$ for each of the six possible hopping ways shown in FIG. 3.

Figure 4:
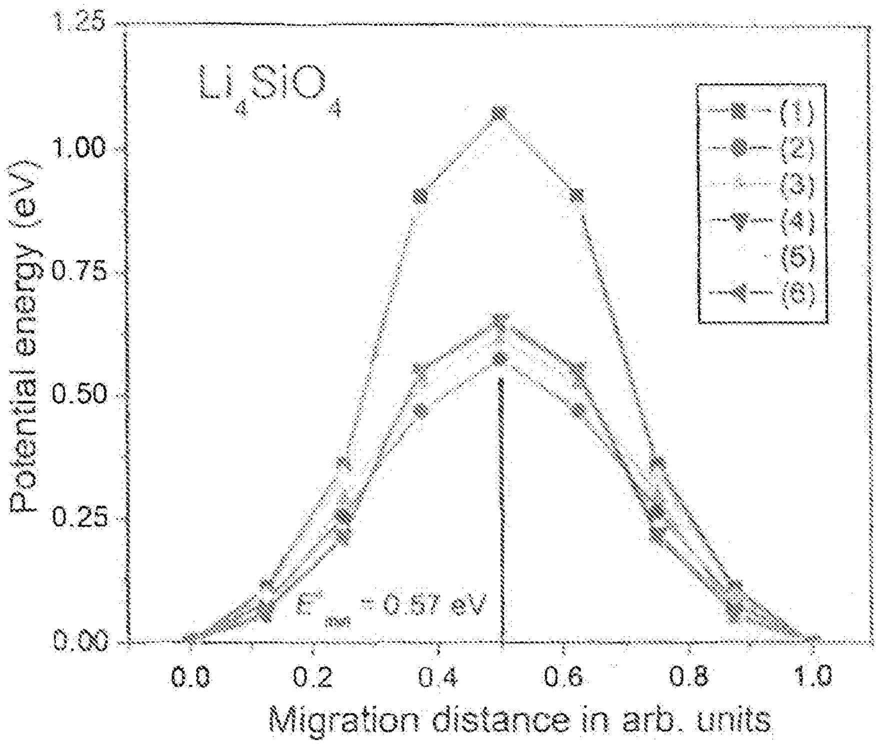
FIG. 4 is a plot that shows potential energy for different migration paths of Li-ions in pure $Li_4SiO_4$.

The calculated potential energies for different pathways in pure $Li_4SiO_4$ are shown in FIG. 4. Depending on the pathways between initial and final locations of Li-ion, the resultant activation barrier values $E_a$ varied between 0.57 eV and 1.07 eV. This occurred due to the fact that all six pathways shown on FIG. 3 are symmetrically non-equivalent, although to different extents. For example, Li-ion following paths 1 and 5 jumped between the two adjacent oxygen ions moving them apart which demanded an appreciable amount of energy resulting in the activation barriers around 1.1 eV for both pathways. In contrast, paths 2, 3, 4, and 6 did not go through the narrow spaces between two oxygen ions, but only enveloped one oxygen ion which was more energetically favorable as compared to paths 1 and 5. This provided the support for the presence of two groups of pathways characterized by substantially different barriers, $E_a$ as shown in FIG. 4.

The calculated $E_a$ values allowed for determining the most favorable pathways for Li-migration, requiring minimal energy dispensation for hopping between adjacent Li-ion sites. For the particular atomic configuration shown on FIG. 3, there were four paths with similar activation barrier values laying between 0.57 eV and 0.65 eV which was within computational error of the model used. Thus, $E_a$=0.6 eV was chosen as a reasonable value for estimation of the diffusion coefficient for pure $Li_4SiO_4$. From Equation 1 at room temperature T=~300° K the diffusion coefficient was calculated to be $\sim7.2\times10^{-13}$ $cm^2/s$. This value was then compared with corresponding numbers for the ionic mobility in doped $Li_4SiO_4$.

D. Ionic Mobility of $Li_4SiO_4$ with Ca, Mg, V, Nb, and F

As aforementioned, doping with different aliovalent elements may contribute to creating ionic vacancies in the crystal structure of the material, thus facilitating Li migration and improving the overall ionic conductivity. This is a consideration for enhancing the conductivity since the more open is the crystal structure, the higher is the resulting ionic mobility expected in the material. Alternatively, the presence of additional elements may reduce the Li-ion mobility due to larger ionic sizes and increased electric charges in the vicinity of the doping elements. Qualitative evaluation of these factors and their effects on the overall Li-ion mobility and ionic conductivity was useful in the identification and selection of the suitable doping elements for achieving high Li-ion conductive materials.

FIG. 3 shows atoms in the $Li_4SiO_4$ structure which were substituted with different elements. Ca and Mg were placed at the Li-type sites, while V and Nb were placed at the Si-sites and F-ions substituted O in the crystal lattice. There were numerous positions the doping elements could occupy in the structure. Selected ionic configurations were used to qualitatively evaluate the role of doping elements in improving the Li-ion diffusivity and mobility.

Figure 5:
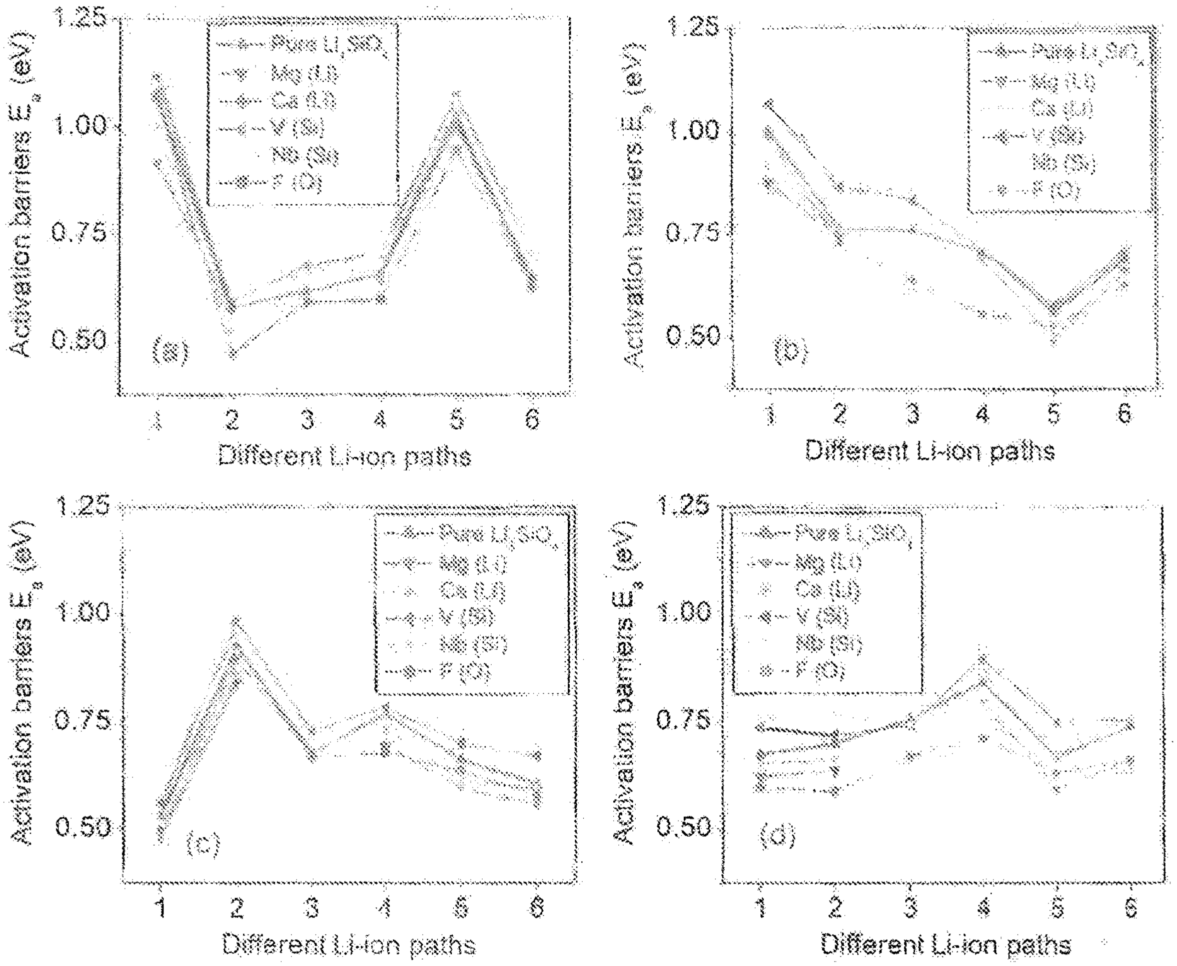
FIG. 5 shows plots of calculated activation barriers E in eV for different crystallographic environments and different migration paths of Li-ions in pure and doped $Li_4SiO_4$, in accordance with certain embodiments of the invention.

Since the important parameter for the diffusion evaluation was the activation barrier $E_a$ of the paths between their initial and final Li-ion positions, $E_a$ for different atomic configurations are illustrated in FIG. 5 where four different local environments of Li-ion are shown in the insets of the corresponding graphs.

It was observed that the introduction of different elements resulted in different changes in heights of the activation barriers. Doping of Mg, Ca and F consistently decreased the $E_a$ values, thus improving the Li-ion diffusivity, while introduction of V and Nb made Li-hopping more energetically demanding which deteriorated the overall ionic mobility. It may be qualitatively explained by considering two factors: (1) the ionic radii of the doping elements in comparison to the values of the corresponding ionic radii of the un-doped $Li_4SiO_4$ and (2) change of the electrostatic interactions between $Li^+$ and corresponding substituted ions of the doping elements. The elements that improved the mobility, such as $Mg^{2+}$ and $F^-$, had smaller ionic sizes than their counterparts $Li^+$ and $O^{2-}$ (0.72 Å vs. 0.76 Å and 1.33 Å vs 1.4 Å for Mg, Li, F and O, respectively), which contributed to lowering the activation barriers due to enlarging structural channels for Li-hopping between the two adjacent sites. The opposite effect of $V^{5+}$ and $Nb^{5+}$ occurred due to their significantly larger ionic sizes in comparison to $Si^{4+}$ (0.355 Å and 0.48 Å vs. 0.26 Å for V, Nb, and Si, respectively). As for the electrostatic interactions between the moving Li-ion and its neighbor atoms, an increase of the ionic charge of the doped atoms from +2 to +3 or from +4 to +5 was expected to increase the electrostatic repulsion and thus, make the movement of the trial $Li^{2+}$ ion more energetically demanding resulting in lowering the Li-mobility.

It was observed that these two factors worked in the same direction for $F^-$ (smaller size, lower ionic charge), and for $V^{5+}$, $Nb^{5+}$, and $Ca^{2+}$ (larger size, higher ionic charge). For $Mg^{2+}$ the factors worked oppositely (smaller size, higher ionic charge). An introduction of F decreased the activation barrier $E_a$ as shown in FIG. 5. Also, V and Nb noticeably increased $E_a$, thus supporting the abovementioned concept of the two factors. Although $Mg^{2+}$ had a higher ionic charge, it had a smaller ionic radius than $Li^+$ which most likely was the decisive factor contributing to determining the overall ionic mobility. As for $Ca^{2+}$, its ionic radius and charge were larger than that of $Li^+$ and its introduction into $Li_4SiO_4$ should not have contributed to facilitating energetics of the Li-mobility according to the abovementioned speculations, which is in contradiction with calculated results shown on FIG. 5.

Using Equation 1 for estimation of the diffusivity coefficient with doping elements, the lowest calculated activation barriers E among the four minimal values shown in FIG. 5 *a-d*, were chosen. For three of the four different atomic configurations, the minimal $E_a$ value was ~0.45 eV, which gave the diffusion coefficient D(T) of $\sim2.4\times10^{-10}$ $cm^2/s$ at room temperature T=300° K, which was 300 times higher than the corresponding D(T) calculated for un-doped $Li_4SiO_4$ (~$7.2\times10^{-13}$ $cm^2/s$).

Thus, the results suggested the use of Mg, Ca, and F as doping elements for improving Li-ion mobility and ionic conductivity of $Li_4SiO_4$ by 2-3 orders of magnitude. Pure and doped lithium orthosilicates were then synthesized and ionic conductivity measured as described in the following Example.

II. Experimental Methods

A. Experiments:

The raw materials used included lithium acetate dihydrate ($CH_3COOLi.2H_2O$, 99.99% trace metals basis), calcium acetate hydrate ($(CH_3COO)_2Ca.xH_2O$, 99.99% trace metals basis), magnesium acetate tetrahydrate ($(CH_3COO)_2Mg.4H_2O$, 99.99% trace metals basis, silica ($SiO_2$, fumed) and lithium fluoride (LiF, ≥99.99% trace metals basis) purchased from Sigma Aldrich.

For the synthesis of calcium and magnesium doped $Li_4SiO_4$, stoichiometric quantities of the raw materials were dispersed in methanol, the quantity of which was adjusted to get 1M $Li^+$ concentration. The solution was then slowly heated at 60° C. under continuous stirring to evaporate methanol. The resulting powder was then heated at 950° C. for 12 h in an alumina crucible. The heating and cooling rates were set at 5° C./min and 1° C./min, respectively. $Li_4SiO_4$ was doped with fluorine using similar methods except that the final temperature was set at 850° C.

B. X-Ray Characterization:

XRD analysis of the powder samples was performed using Philips XPERT PRO system equipped with a monochromator that employs $CuK_\alpha$ ($\lambda$=0.15406 nm) with a 45 kV operating voltage and 40 mA operating current. The 2θ value was varied from 10 to 90° with a step size of 0.040.

C. Electrochemical Impedance Analysis:

For ionic conductivity measurements, $Li_4SiO_4$ and the doped compounds were made into 2 mm-thick pellets using a 13 mm-diameter die by applying a uniform pressure of 5 MPa for 5 minutes. The pellets were then sintered at 950° C. for 4 hrs. CR 2032 type coin cells were assembled by embedding these pellets between two lithium foils. The AC impedance measurements were performed at 25° C., over a frequency range of 0.01 Hz to 100 kHz at 10 mA amplitude. The impedance spectra obtained experimentally were interpreted and analyzed using Z-View (Scribner Associates, Inc.; version 3.3c).

III. Experimental Results and Discussion

Figure 6:
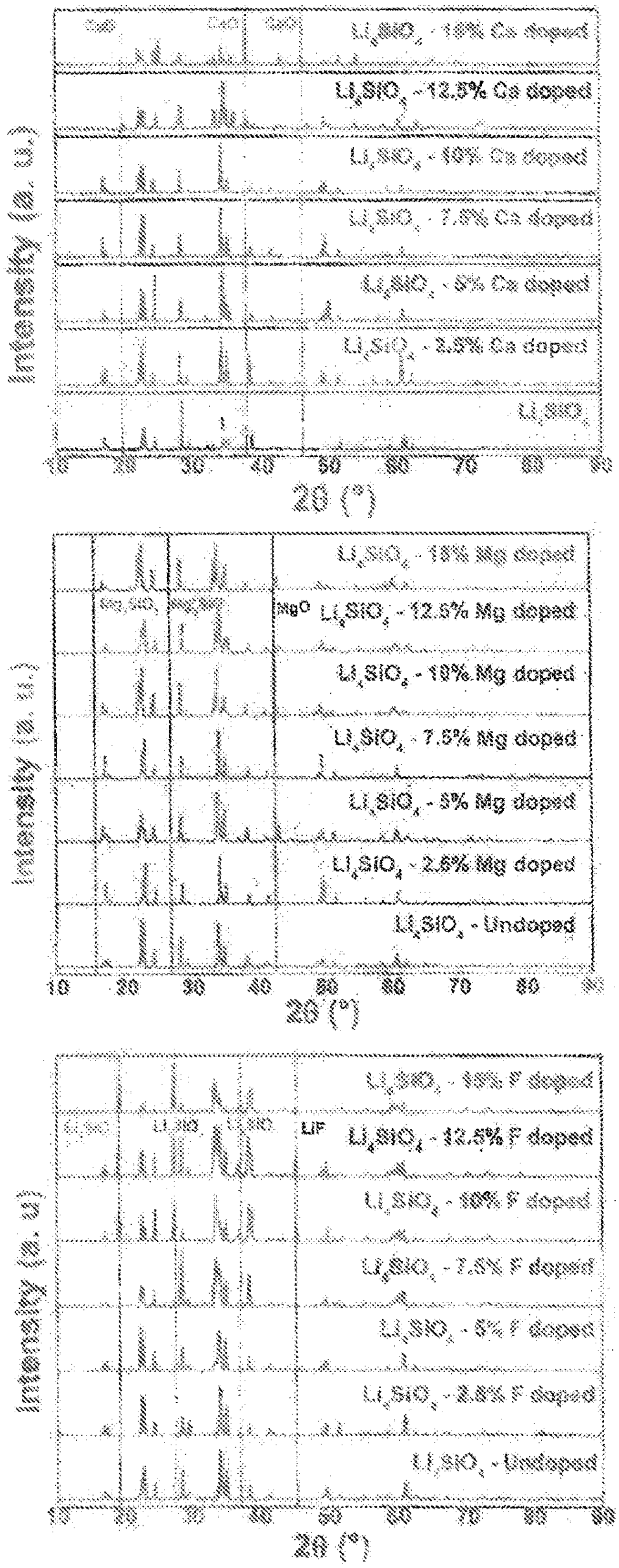
FIG. 6 is an XRD spectra of calcium-, magnesium- and fluorine-doped $Li_4SiO_4$, in accordance with certain embodiments of the invention.

FIGS. 6*a-c* show the XRD patterns of calcium, magnesium and fluorine doped lithium orthosilicate. Doping does not alter the monoclinic lattice structure of $Li_4SiO_4$ at low doping concentrations. A maximum of 7.5% lithium sites were successfully doped with the divalent cations of calcium and magnesium. Further, increased dopant concentration resulted in the formation of CaO secondary phases in the case of calcium doping (FIG. 6*a*) and $Mg_2SiO_3$ and MgO in the case of magnesium doping (FIG. 6*b*). In contrast, up to 10% oxygen sites were replaced with monovalent fluoride ions maintaining the crystal's phase purity, secondary phases of $Li_4SiO_3$ and LiF began to appear upon excessive doping.

Figure 7:
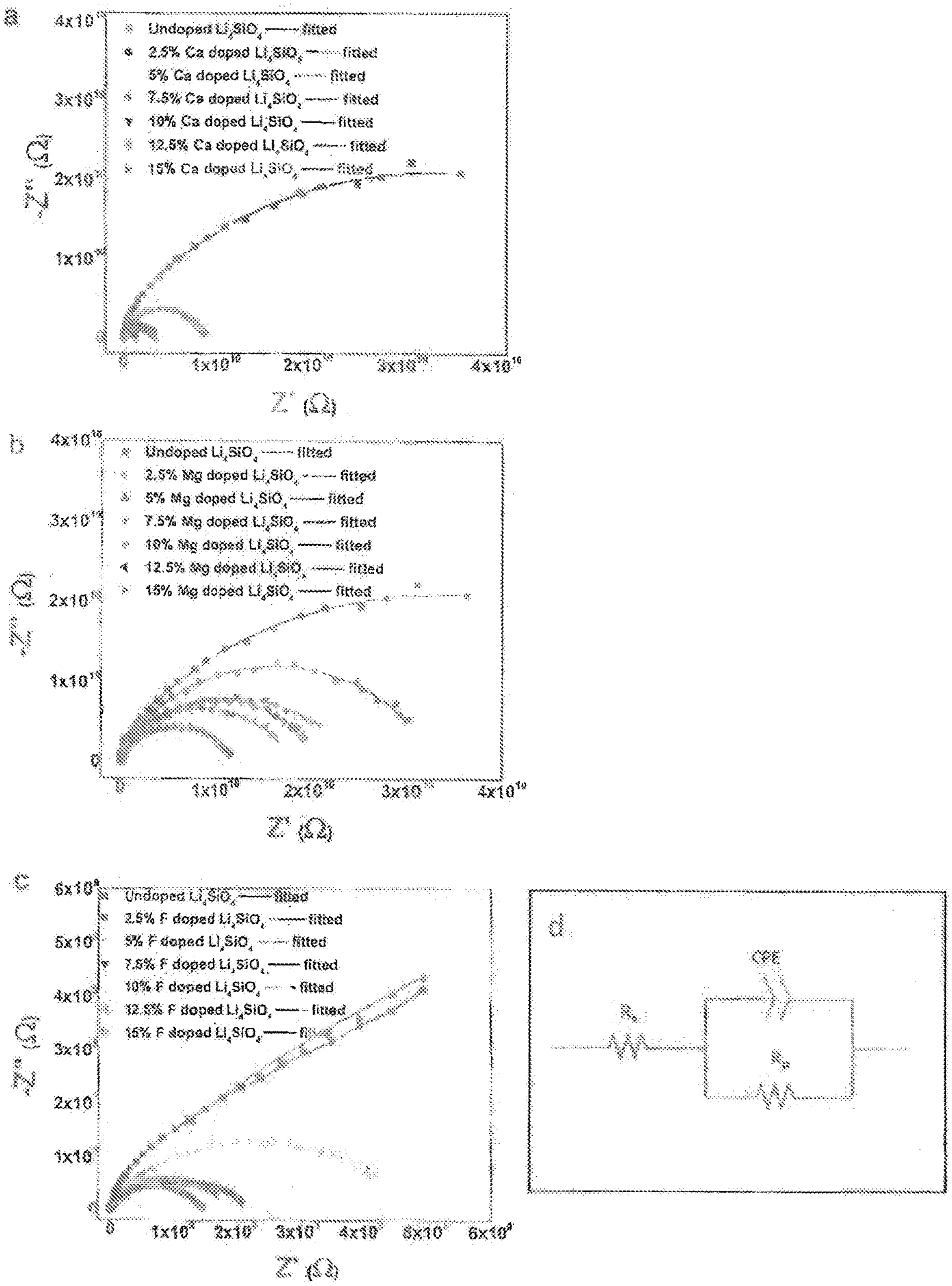
FIG. 7, views (a)-(c) are Nyquist plots of calcium-, magnesium- and fluorine-doped $Li_4SiO_4$, and view (d) shows an equivalent circuit used to fit the impedance data, in accordance with certain embodiments of the invention.

The complex impedance is plotted in a complex plane with real versus imaginary as indicated by the Cole-Cole plot. FIGS. 7*a-c* shows the experimental impedance results of the three doped orthosilicates. As clearly shown in FIG. 7*a-c*, the impedance data of calcium, magnesium and fluorine doped orthosilicates are very similar. The semicircle in the impedance plots at higher frequencies is due to bulk ionic conduction and the spikes at low frequency are due to the secondary ionic carrier, grain-boundary diffusion in powder samples or surface ion diffusion. It was suggested that the spikes at low frequencies in this case are due to electrode surface effects which was also observed in other single crystal impedance measurements.

The simplest equivalent circuit for a Cole-Cole plot is a RC parallel circuit whose impedance is given by Equation 2:

$$Z_{R\|C} = \frac{R - i\omega CR}{1 + \omega^2 C^2 R^2} \quad (2)$$

in which ω is the angular frequency with ω=2πf. The corresponding Cole-Cole plot is a semicircle, whose diameter is equal to R, and the angular frequency $\omega_p$ at which the peak occurs obey to the equation: $\omega_p$=1/RC. The Cole-Cole plots are typically partial semicircles, which can be numerically fitted by using a simple RC circuit. However, the Cole-Cole plots spike at lower frequency is usually due to the surface roughness. The Cole-Cole plots in such cases could be simulated by an RC circuit in series with a Constant-Phase element (CPE), whose complex impedance is given by Equation 3:

$$Z_{CPE} = Af^{-n}\left(\cos\frac{n\pi}{2} - i\sin\frac{n\pi}{2}\right) \quad (3)$$

which produces a straight line with an angle of nπ/2 with the R axis in the Cole-Cole plot.

The numerical fit of the equivalent circuit to the experimental Cole-Cole plot was done by fitting the frequency dependent real part and the imaginary part of the equations to the experimental data. The fit resulted from the real part and the imaginary part being very close. In this work, the fits were done by using the Zview™ software package from 12 Hz to 10000 Hz. FIG. 7*d* shows the simple equivalent circuit used to fit the experimental results, where Rs represents the contact resistance inside the cell, Rp represents the resistance to lithium ion mobility and CPE is the constant phase element arising from the dielectric capacitance across the solid electrolyte. The fitted values of Rs, Rp, CPE-T and CPE-P are tabulated in Table 1S-Table 3S (T1S-T3S).

TABLE 1S

Fitted results of Ca substituted orthosilicate (Each datum represents an average of three independent tests run on three different samples under identical conditions.)

| % Ca doped | $R_s$ (Ohm) | CPE-T × $10^{11}$ | CPE-P | $R_p$ (Ohm) | Conductivity × $10^{12}$ (S/cm) |
|---|---|---|---|---|---|
| 0 | 1.70 ± 0.21 | 5.26 ± 0.32 | 0.78 ± 0.05 | 1.29 ± 0.21E+11 | 1.17 ± 0.25 |

TABLE 1S-continued

Fitted results of Ca substituted orthosilicate (Each datum represents an average of three independent tests run on three different samples under identical conditions.)

| % Ca doped | $R_s$ (Ohm) | CPE-T × $10^{11}$ | CPE-P | $R_p$ (Ohm) | Conductivity × $10^{12}$ (S/cm) |
|---|---|---|---|---|---|
| 2.5 | 2.57 ± 0.35 | 5.14 ± 0.27 | 0.79 ± 0.05 | 3.07 ± 0.42E+09 | 49.14 ± 13.62 |
| 5 | 3.06 ± 0.26 | 3.87 ± 0.46 | 0.94 ± 0.09 | 1.29 ± 0.17E+08 | 1169.55 ± 292.65 |
| 7.5 | 8.47 ± 0.76 | 5.19 ± 0.28 | 0.70 ± 0.12 | 5.25 ± 0.73E+06 | 28706.07 ± 8000.53 |
| 10 | 1.12 ± 0.08 | 4.11 ± 0.54 | 0.81 ± 0.04 | 1.26 ± 0.20E+09 | 119.27 ± 37.34 |
| 12.5 | 9.85 ± 0.62 | 4.15 ± 0.63 | 0.82 ± 0.05 | 3.34 ± 0.45E+09 | 45.08 ± 11.4 |
| 15 | 1.40 ± 0.07 | 4.29 ± 0.54 | 0.79 ± 0.03 | 9.12 ± 1.12E+09 | 16.54 ± 3.8 |

TABLE 2S

Fitted results of Mg substituted orthosilicate (Each datum represents an average of three independent tests run on three different samples under identical conditions.)

| % Mg doped | $R_s$ (Ohm) | CPE-T × $10^{11}$ | CPE-P | $R_p$ (Ohm) | Conductivity × $10^{12}$ (S/cm) |
|---|---|---|---|---|---|
| 0 | 1.91 ± 0.09 | 3.59 ± 0.29 | 0.79 ± 0.06 | 7.82 ± 0.82E+10 | 1.19 ± 0.32 |
| 2.5 | 5.24 ± 0.46 | 9.53 ± 1.02 | 0.76 ± 0.04 | 3.39 ± 0.28E+10 | 4.45 ± 0.72 |
| 5 | 1.36 ± 0.05 | 5.67 ± 0.84 | 0.85 ± 0.05 | 8.22 ± 0.96E+08 | 183.51 ± 37.40 |
| 7.5 | 7.44 ± 0.82 | 7.16 ± 0.68 | 0.84 ± 0.10 | 1.18 ± 0.15E+08 | 1277.59 ± 275.72 |
| 10 | 1.39 ± 0.23 | 9.80 ± 1.16 | 0.83 ± 0.09 | 2.09 ± 0.26E+10 | 7.23 ± 1.62 |
| 12.5 | 1.69 ± 0.07 | 8.20 ± 0.85 | 0.83 ± 0.07 | 5.14 ± 0.35E+10 | 2.94 ± 0.70 |
| 15 | 1.78 ± 0.03 | 4.96 ± 0.28 | 0.86 ± 0.04 | 5.37 ± 0.42E+10 | 2.81 ± 0.48 |

TABLE 3S

Fitted results of F substituted orthosilicate (Each datum represents an average of three independent tests run on three different samples under identical conditions.)

| % F doped | $R_s$ (Ohm) | CPE-T × $10^{10}$ | CPE-P | $R_p$ (Ohm) | Conductivity × $10^{12}$ (S/cm) |
|---|---|---|---|---|---|
| 0 | 3.54 ± 0.54 | 1.16 ± 0.09 | 0.76 ± 0.04 | 1.26 ± 0.20E+11 | 1.19 ± 0.32 |
| 2.5 | 2.40 ± 0.12 | 1.59 ± 0.21 | 0.79 ± 0.06 | 7.52 ± 0.63E+09 | 20.04 ± 6.60 |
| 5 | 1.32 ± 0.06 | 1.67 ± 0.08 | 0.81 ± 0.06 | 4.96 ± 0.55E+09 | 30.41 ± 8.50 |
| 7.5 | 1.01 ± 0.02 | 2.06 ± 0.29 | 0.76 ± 0.08 | 2.39 ± 0.19E+09 | 63.13 ± 10.41 |
| 10 | 3.08 ± 0.21 | 2.01 ± 0.08 | 0.71 ± 0.02 | 4.19 ± 0.32E+08 | 359.63 ± 54.34 |
| 12.5 | 1.43 ± 0.07 | 1.63 ± 0.12 | 0.70 ± 0.06 | 1.96 ± 0.19E+09 | 76.95 ± 15.42 |
| 15 | 1.27 ± 0.08 | 1.47 ± 0.06 | 0.79 ± 0.04 | 3.23 ± 0.42E+10 | 4.66 ± 0.87 |

The fitted value of $R_p$ was used to calculate the lithium ionic conductivity($\sigma$) of the doped orthosilicates using Equation 4:

$$\sigma = \frac{1}{R_p} \times \frac{t}{S} \qquad (4)$$

wherein $R_p$ is the resistance, t is the thickness and S is the surface area of the orthosilicates, respectively.

Figure 8:
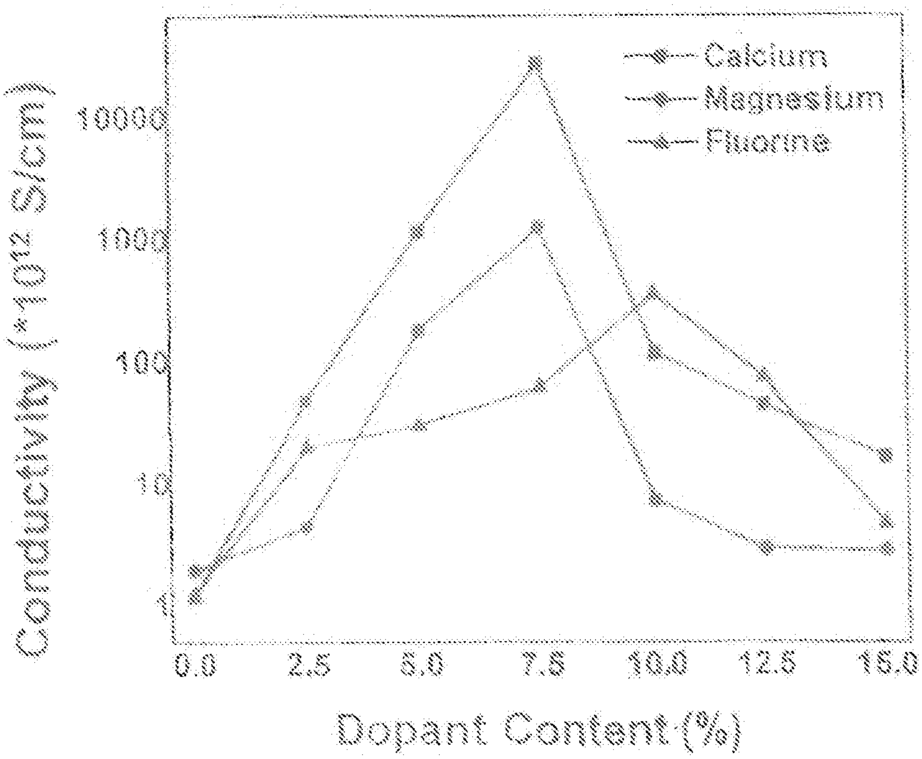
FIG. 8 is a plot showing a comparison of the effect of calcium, magnesium and fluorine doping on ionic conductivity of $Li_4SiO_4$, in accordance with certain embodiments of the invention.

The lithium ion conductivities of calcium, magnesium and fluorine doped orthosilicates at ambient temperature are plotted in FIG. 8. The lithium ion conductivity of un-doped $Li_4SiO_4$ was $1.17*10^{-12}$ S/cm. Upon doping, the ionic conductivity increased by 3-4 orders due to the introduction of $Li^+$ vacancies as previously explained by DFT calculation. The doped orthosilicates increased in ionic conductivity up to 7.5% for calcium and magnesium doping and 10% for fluorine doping. The ionic conductivity of lithium orthosilicates increased to $2.87*10^{-8}$ S/cm and $1.27*10^{-9}$ S/cm upon 7.5% doping of calcium and magnesium, respectively. Upon 10% doping of fluorine, the lithium ionic conductivity increased to $3.59*10^{-10}$ S/cm. The ionic conductivities decreased at higher dopant concentrations due to the formation of impure secondary phases as shown by XRD. This could be explained by the introduction of grain boundaries by the secondary phases formed at higher dopant concentrations.

Conclusions

Density Function Theory (DFT) suggested that doping $Li_4SiO_4$ with different aliovalent elements contributed to creating ionic vacancies in the crystal structure, facilitating Li migration and improving the overall ionic conductivity. The theoretical study also suggested the use of Mg, Ca, and F as dopants improved the Li-ion mobility and ionic conductivity of $Li_4SiO_4$ on 2-3 orders of magnitude. To provide confirmation and validation, $Li_4SiO_4$ was doped with six different concentrations of each of the dopants using a high temperature solid diffusion technique. A maximum of 7.5 atomic % of $Li^+$ sites were doped with $Ca^{2+}$ and $Mg^{2+}$ ions, and 10% of the $O^{2-}$ sites were doped with $F^-$ ions with phase purity. The Electrochemical Impedance Spectroscopy (EIS) analysis results showed that the doping improved the ionic conductivity of $Li_4SiO_4$ by 3-4 orders of magnitude. $Ca^{2+}$ doping showed the maximum improvement in ionic conductivity from $1.179\times10^{-12}$ S $cm^{-1}$ to $2.870\times10^{-8}$ S $cm^{-1}$. This improvement in lithium ionic conductivity upon doping may provide for the development of all solid-state lithium batteries with oxide-based solid electrolytes.

Example 2

Figure 9:
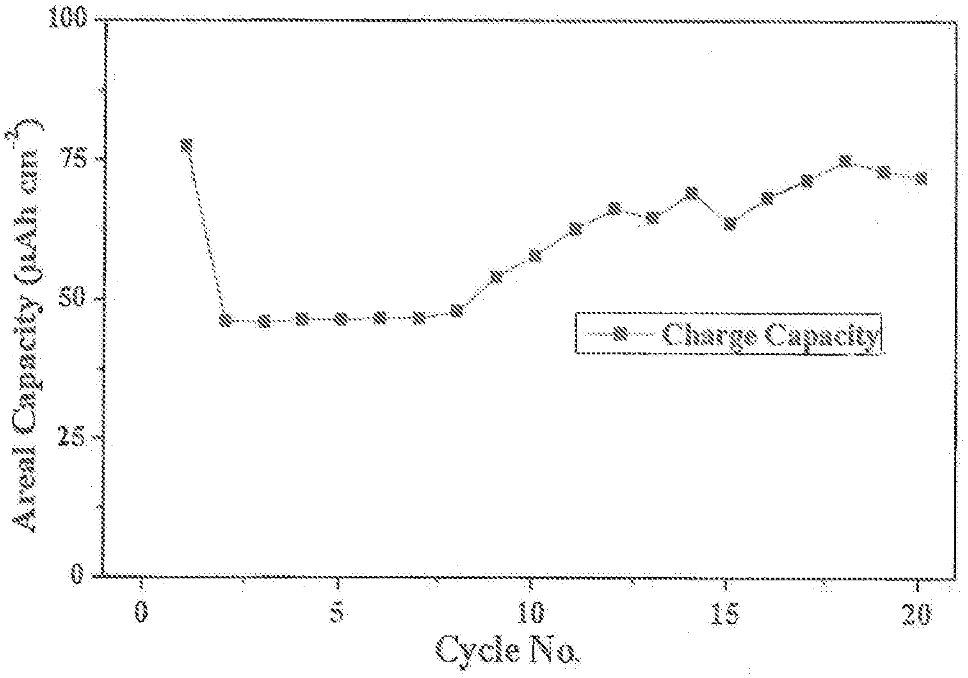
FIG. 9 is a plot showing electrochemical cycling behavior of $LiCoO_2$ thin films, in accordance with certain embodiments of the invention.

Development of Lithium Cobalt Oxide Thin Film Cathodes for Lithium Ion Batteries In addition to the above, thin films of $LiCoO_2$ were developed using RF magnetron sputtering and tested in CR2025 coin cells with a current density of 50 $\mu A/cm^2$ between the voltage window of 2.5-4.1V in 1M $LiPF_6$ in EC:DEC:FEC=45:45:10 (% vol). The thin films showed an areal charge capacity (FIG. 9) of ~45-75 $\mu A/cm^2$ when cycled with Li as the counter and reference electrodes.

Example 3

Comparison of Dopants on Ionic Conductivity of $Li_4SiO_4$

The performance and stability of the anodes and cathodes may be further improved by developing solid electrolyte using appropriate dopants (FIG. 8) to replace the liquid electrolyte to enable an all-in-one foldable portable digital and mobile as well as consumer device. Density functional theory calculations suggest that doping $Li_4SiO_4$ with different aliovalent elements help create ionic vacancies in the crystal structure, facilitating Li migration and thus, improving the overall ionic conductivity. The theoretical study also suggested the use of Mg, Ca, and F as preferred dopants for improving the Li-ion mobility and ionic conductivity of $Li_4SiO_4$ by 2-3 orders of magnitude. FIG. 4 demonstrates calculated potential energy for different migration pathways of Li-ions in pure $Li_4SiO_4$. One can see that the lowest activation barriers $E_a$ are around ~0.6 eV which could be used for calculation of the diffusion coefficient for Li-ions using the formula: $D(T)=a^2\nu^*\exp\{-E_a/k_bT\}$, where D is the diffusion coefficient, a—the hopping distance (~3.0 Å in his case), $\nu^*$—hopping frequency ($\sim10^{13}s^{-1}$). From this equation at room temperature T=300° K, the diffusion coefficient $D=\sim7.2\times10^{-13}$ $cm^2/s$.

Doping of $Ca^{2+}$ and $Mg^{2+}$ ions to substitute for Li-sites and F in O-sites helped create Li-vacancies in the lattice and facilitated the Li-ion migration via vacancy hopping mechanism. Using density functional theory approach implemented in the Vienna Ab-initio Simulation Package of the computational Physics and Chemistry, the corresponding activation barriers $E_a$ for the abovementioned dopants were calculated and found to be around ~0.45 eV on average for Ca, Mg, and F, which gives the diffusion coefficient D(T) to be $\sim2.4\times10^{-10}$ $cm^2/s$ at room temperature, thus increasing the value 300 fold compared to undoped $Li_4SiO_4$. The theoretical study allowed for the prediction that doping of Ca, Mg, and F may improve the Li-mobility and ionic conductivity by 2-3 orders.

In order to validate the theoretical calculations, $Li_4SiO_4$ was accordingly doped with six different concentrations of each dopants using a high temperature solid-state diffusion technique. A maximum of 7.5 atomic % of $Li^+$ sites were doped with $Ca^{2+}$ and $Mg^{2+}$ ions and 10% of the $O^{2-}$ sites were doped with F ions while maintaining the crystallographic and phase purity. Electrochemical Impedance Spectroscopy (EIS) analysis results clearly showed that the introduction of the dopants improved the ionic conductivity of $Li_4SiO_4$ by 3-4 orders of magnitude. The $Ca^{2+}$ introduction as a dopant showed the maximum improvement in ionic conductivity from $1.179\times10^{-12}$ S $cm^{-1}$ to $2.870\times10^{-8}$ S $cm^{-1}$. This strategy may be implemented for improving the lithium ion conductivity following introduction of dopants.

Figure 10:
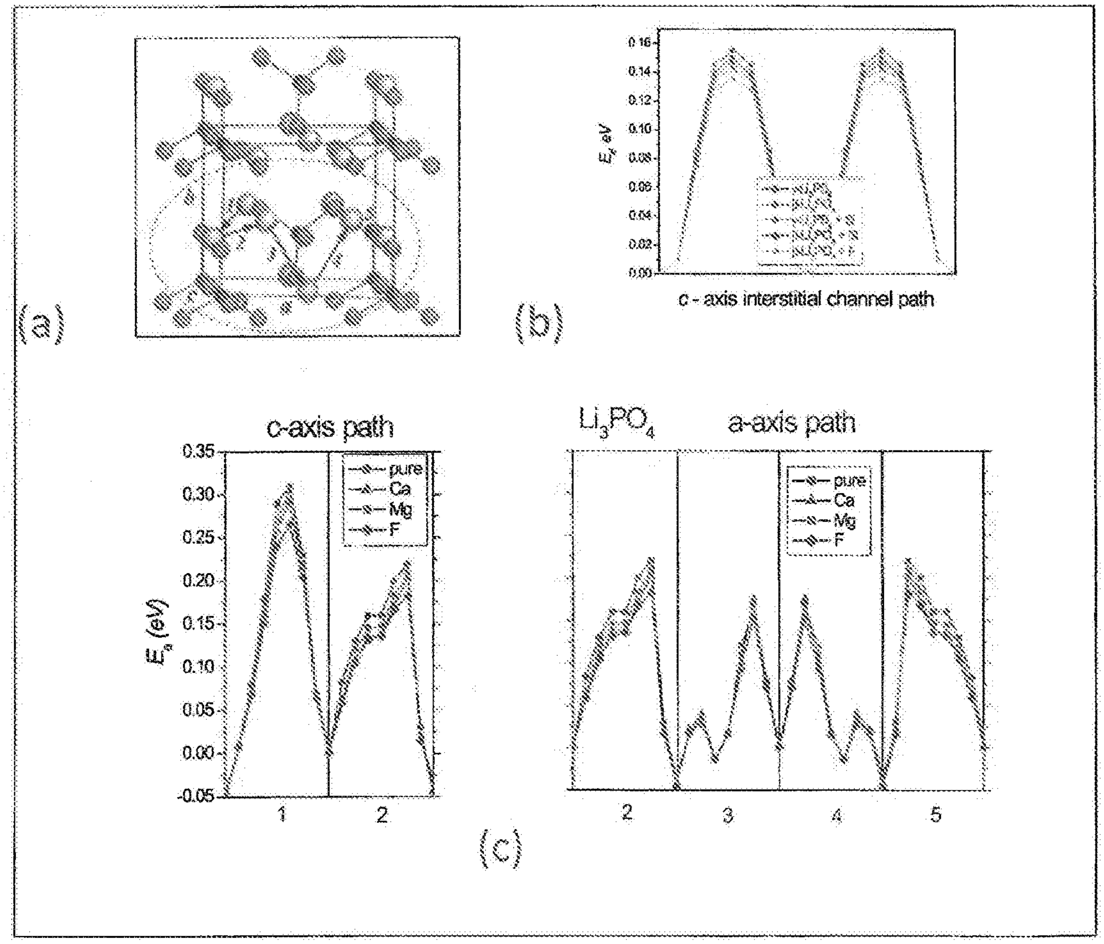
FIG. 10, views (a)-(c), are plots of crystal structure and potential energy for hopping pathways of $Li_3PO_4$ and $Li_3PS_4$, in accordance with certain embodiments of the invention.

$Li_3PO_4$ and $Li_3PS_4$ orthophosphates and phosphosulfides were tested. Such Li-ion conductors also have potential for improving the ionic conductivity by doping with $Ca^{2+}$ and $Mg^{2+}$ to substitute for Li-sites and F to substitute for O or S sites to create Li-vacancies for facilitating Li-ion hopping within the crystal structure. Doping of $Si^{4+}$ ions to substitute for P sites helped increase number of interstitial $Li^+$ ions in the open tunnels along the c-direction of the structure. For these purposes different Li-ion migration pathways were considered for calculations of the activation barriers, $E_a$. FIG. 10*a* demonstrates crystal structure for $Li_3PO_4$ and $Li_3PS_4$ as well as various Li-ion pathways during migration in the a- and c-crystallographic directions. FIG. 10*b,c* demonstrate the calculated $E_a$ in various pathways for pure structures as well as for those doped with different elements. Table 1 shows the calculated diffusion coefficients D for pure and doped $Li_4SiO_4$, $Li_3PO_4$ and $Li_3PS_4$. The presence of dopants helped decrease the activation barriers to some extent, thus resulting in a slight improvement in the Li-ion conductivity. Computational details: The calculational methods were based on density functional theory using the projector augmented wave (PAW) formalism. The PAW basis and projector functions were constructed by VASP package. The exchange-correlation functional was used in the generalized gradient approximation (GGA) form. Li vacancies and interstitials were modeled in supercells containing 2×2×2 unit cells with 2 formula units of $Li_3PO_4$ and $Li_3PS_4$ in each unit cell. A total of 16 formula units with 128 atoms in the whole supercell were used to estimate activation energies $E_a$ for Li ion migration with the "nudged elastic band" method implemented in VASP.

TABLE 1

Calculated diffusion coefficients D for pure and doped lithium ion conductors.

| | D vac (in $cm^2/s$) | D vac in a-axis | D vac in c-axis | D interstitial in c-axis | D vac in a-axis Ca/Mg/F | D vac in c-axis Ca/Mg/F | D interstitial in c-axis Si/F |
|---|---|---|---|---|---|---|---|
| $Li_4SiO_4$ | $7.2\times10^{-13}$ | | | | | | |
| $Li_3PO_4$ | | $2.0\times10^{-6}$ | $6.2\times10^{-8}$ | $2.5\times10^{-5}$ | $3.9\times10^{-6}$ | $1.3\times10^{-7}$ | $3.5\times10^{-5}$ |
| | | | | | $3.1\times10^{-6}$ | $7.5\times10^{-8}$ | $7.3\times10^{-4}$ |
| | | | | | $8.8\times10^{-6}$ | $3.5\times10^{-7}$ | |
| $Li_3PS_4$ | | $4.4\times10^{-6}$ | $2.0\times10^{-7}$ | $3.0\times10^{-5}$ | | | $4.1\times10^{-5}$ |

The invention claimed is:

1. A size-adjustable all-in-one electronic device, comprising:

a plurality of flexible sequential layers integrated in a stacked configuration to form a flexible, size-adjustable, hand-held single electronic device comprising more than one of a cell phone, a tablet, and a laptop personal computer, comprising:

a first layer of a flexible LED screen having a front surface and an opposite back surface;

a second layer of flexible electronics having a front surface and an opposite back surface wherein the front surface of the second layer is connected to the back surface of the first layer;

a third layer of a flexible lithium ion battery unit having a front surface and an opposite back surface wherein the front surface of the third layer is connected to the back surface of the second layer, comprising:

a flexible composite, multilayer anode, comprising:

porous, lithium metal alloy foam;

a structurally isomorphous lithium alloy; and a lithium ion conductor coating deposited on a surface of the porous, lithium metal alloy foam, comprising:

a compound selected from the group consisting of $Li_4SiO_4$, $Li_3PO_4$ and $Li_3PS_4$, and mixtures or combinations thereof; and dopant selected from the group consisting of calcium, magnesium, fluorine, vanadium, niobium, and mixtures or combinations thereof, wherein the porous, lithium metal alloy foam is deposited on a metal current collector comprising copper or stainless steel;

a flexible cathode, comprising:

an electro-spun fiber mat comprising:

sulfur fibers having a diameter from about 1 to about 7 μm; and alternating layers of sulfur fibers and a Li-ion conducting polymer;

a flexible gel-polymer electrolyte separator positioned between the flexible anode and flexible cathode, comprising:

a lithium ion conducting composite polymer electrolyte separator, comprising:

an electro-spun poly(vinylidene fluoride-co-hexafluoro propylene) matrix, comprising:

about 10 to 20 wt. percent from one or more of silica nanoparticles, titania nanoparticles, fumed silica nanoparticles and mixtures or combinations thereof; and dopant selected from the group consisting of $Al_2O_3$, $B_2O_3$, $GeO_2$, $SnO_2$, $Bi_2O_3$, $Sb_2O_3$, and combinations and mixtures thereof, wherein the flexible anode, flexible cathode and flexible electrolyte are connected to form a single composite; and a fourth layer of a flexible casing having a front surface and an opposite back surface wherein the front surface of the fourth layer is connected to the back surface of the third layer, and the back surface of the fourth layer forms the exterior surface of the device, wherein, the plurality of layers is conformable to the size-adjustable single electronic device.

2. The size-adjustable, all-in-one electronic device of claim 1, wherein it functions as a laptop personal computer.

3. The size-adjustable, all-in-one electronic device of claim 1, wherein it functions as an electronic tablet.

4. The size-adjustable, all-in-one electronic device of claim 1, wherein it is adjustable to function as a cell phone.

5. The size-adjustable, all-in-one electronic device of claim 1, wherein its size is adjusted by folding.

6. The size-adjustable, all-in-one electronic device of claim 1, wherein its size is adjusted by rolling.

7. The size-adjustable, all-in-one electronic device of claim 1, wherein the flexible gel-polymer electrolyte comprises fumed silica nanoparticles as a nanostructured filler.

8. A method of preparing a size-adjustable all-in-one electronic device, comprising:

integrating a plurality of flexible sequential layers in a stacked configuration forming a flexible, size-adjustable, hand-held single electronic device comprising more than one of a cell phone, a tablet, and a laptop personal computer, comprising:

obtaining a flexible LED screen having a front surface and an opposite back surface;

connecting flexible electronics having a front surface and an opposite back surface to the flexible LED screen, wherein the front surface of the flexible electronics is connected to the back surface of the flexible LED screen;

connecting a flexible battery unit having a front surface and an opposite back surface to the flexible electronics, wherein the front surface of the flexible battery unit is connected to the back surface of the flexible electronics, the flexible battery unit comprising:

a flexible composite, multilayer anode, comprising:

porous, lithium metal alloy foam;

a structurally isomorphous lithium alloy; and a lithium ion conductor coating deposited on a surface of the porous, lithium metal alloy foam, comprising:

a compound selected from the group consisting of $Li_4SiO_4$, $Li_3PO_4$ and $Li_3PS_4$, and mixtures or combinations thereof; and dopant selected from the group consisting of calcium, magnesium, fluorine, vanadium, niobium, and mixtures or combinations thereof, wherein the porous, lithium metal alloy foam is deposited on a metal current collector comprising copper or stainless steel;

a flexible cathode, comprising:

sulfur fibers having a diameter from about 1 to about 7 μm; and alternating layers of sulfur fibers and a Li-ion conducting polymer; and a flexible gel-polymer electrolyte separator positioned between the flexible anode and cathode, comprising:

a lithium ion conducting composite polymer electrolyte separator, comprising:

an electro-spun poly (vinylidene fluoride-co-hexafluoro propylene) matrix, comprising:

about 10 to 20 wt. percent from one or more of silica nanoparticles, titania nanoparticles,-fumed silica nanoparticles and mixtures or combinations thereof; and dopant selected from the group consisting of $Al_2O_3$, $B_2O_3$, $GeO_2$, $SnO_2$, $Bi_2O_3$, $Sb_2O_3$, and combinations and mixtures thereof, wherein the flexible anode, flexible cathode and flexible electrolyte are connected to form a single composite; and connecting a flexible casing having a front surface and an opposite back surface to the flexible battery unit, wherein the front surface of the flexible casing is connected to the back surface of the flexible battery unit, and the back surface of the flexible casing forms the exterior surface of the device.

* * * * *